(12) United States Patent
Clarke

(10) Patent No.: US 7,124,707 B1
(45) Date of Patent: Oct. 24, 2006

(54) SELECTIVE ANIMAL FEEDING APPARATUS

(76) Inventor: Jennifer Anne Clarke, 3433 Idaho Dr., Santa Rosa, CA (US) 95405

( * ) Notice: Subject to any disclaimer, the term of this patent is extended or adjusted under 35 U.S.C. 154(b) by 0 days.

(21) Appl. No.: 11/032,765

(22) Filed: Jan. 10, 2005

(51) Int. Cl.
*A01K 1/10* (2006.01)
*A01K 5/00* (2006.01)
*A01K 39/00* (2006.01)

(52) U.S. Cl. ............... 119/51.02; 119/61.5; 119/51.01; 119/57.92

(58) Field of Classification Search ............ 119/51.02, 119/14.14, 51.12, 61.5, 720, 51.11, 51.14, 119/51.5, 51.13, 61.3
See application file for complete search history.

(56) References Cited

U.S. PATENT DOCUMENTS

| | | | | | |
|---|---|---|---|---|---|
| 2,157,682 | A | * | 5/1939 | Sweeny | 119/63 |
| 3,532,075 | A | * | 10/1970 | Cooper | 119/51.12 |
| 4,655,170 | A | * | 4/1987 | DaSilva | 119/51.02 |
| 5,576,972 | A | * | 11/1996 | Harrison | 702/128 |
| 5,649,499 | A | * | 7/1997 | Krietzman et al. | 119/52.1 |
| 5,669,328 | A | * | 9/1997 | Lanfranchi | 119/57.92 |
| 6,044,795 | A | * | 4/2000 | Matsuura et al. | 119/51.02 |
| 6,349,671 | B1 | * | 2/2002 | Lewis et al. | 119/51.02 |
| 6,446,574 | B1 | * | 9/2002 | Bickley | 119/55 |
| 6,956,483 | B1 | * | 10/2005 | Schmitt et al. | 340/573.3 |
| 2002/0134313 | A1 | * | 9/2002 | King et al. | 119/51.02 |
| 2003/0084853 | A1 | * | 5/2003 | Voogd et al. | 119/51.02 |
| 2004/0103848 | A1 | * | 6/2004 | van den Berg | 119/51.02 |
| 2004/0216679 | A1 | * | 11/2004 | Ealy et al. | 119/14.08 |
| 2005/0061252 | A1 | * | 3/2005 | Meeks et al. | 119/51.02 |

FOREIGN PATENT DOCUMENTS

GB       2120071 A    * 11/1983

* cited by examiner

*Primary Examiner*—Teri Pham Luu
*Assistant Examiner*—Joshua Michener
(74) *Attorney, Agent, or Firm*—Risto A. Rinne, Jr.

(57) ABSTRACT

An apparatus for the dissemination of food to a first animal when the first animal is disposed proximate the apparatus includes a container for receipt of the food and a transmitter that is attached to the first animal and a receiver that is operatively attached to the apparatus. The transmitter emits a signal continuously according to a preferred embodiment or a signal only when it is proximate the apparatus, according to a modification. The apparatus is adapted to receive and respond to the signal to allow access to the food in the container when the signal is present. When the signal is not received by the apparatus, access to the food in the container is denied.

14 Claims, 3 Drawing Sheets

SELECTIVE ANIMAL FEEDING APPARATUS

BACKGROUND OF THE INVENTION

1. Field of the Invention

The present invention, in general relates to the feeding of pets and livestock and, more particularly, to the feeding of a first animal while preventing the feeding of a second animal.

Pet owners as well as livestock owners are faced with the problem of allowing access to a particular type of food by one animal or pet while restricting access by a second animal or pet.

Pet owners, for example, who have both cats and dogs, are well familiar with the varied eating habits of each species. Dogs tend to eat so fast as to almost inhale their food whereas cats eat in a leisurely manner, nibbling or eating a small portion, resting, and returning later to consume some additional food. Furthermore, dogs will continue to eat their food and the food of other animals even after they are sufficiently full.

The problem that arises is that the dog will quickly consume its own food and then also quickly consume any food a cat may have left behind in its bowl, as well. Dogs tend to be opportunistic eaters and will not hesitate to eat the food of other animals and pets, including that of livestock, which they find palatable.

When a dog eats the cat's food this, at best, deprives the cat of an adequate supply of food. It also permits the dog to eat an excessive and potentially unhealthy quantity of food.

Sometimes, dog, cat, or both are on a special, restricted diet. For example, if the dog is on a restricted diet, consuming the cat's food supply can be detrimental to its health. Similarly, if the cat is on a special diet and the dog is not, it is safe to assume that the cat's special diet is quite expensive. It is clearly not desirable for the dog to consume expensive cat food after having already eaten its own proper dog food.

The same problem can occur with other types of livestock. For example, cattle should not be allowed to consume the fodder that is intended for swine. There are numerous situations where it is desirable to restrict access to the food of a first animal so that it cannot be consumed by a second animal.

Accordingly, there exists today a need for a selective animal feeding apparatus that provides access to a food by a desired first animal and which prevents access to the food by a second animal.

Clearly, such an apparatus would be a useful and desirable device.

2. Description of Prior Art

Animal feeders, dog and cat bowls are, in general, known. There are no known devices that selectively allow access to food by a first animal upon detection of the proximal presence of the first animal while preventing access by a second animal when the first animal is not present. While the structural arrangements of the above described devices may, at first appearance, have certain similarities with the present invention, they differ in material respects. These differences, which will be described in more detail hereinafter, are essential for the effective use of the invention and which admit of the advantages that are not available with the prior devices.

OBJECTS AND SUMMARY OF THE INVENTION

It is an object of the present invention to provide a selective animal feeding apparatus that allows access to food by a first animal and which prevents access to the food by a second animal.

It is also an important object of the invention to provide a selective animal feeding apparatus that includes a transmitter that is worn by an animal that is intended to access food in the apparatus.

Another object of the invention is to provide a selective animal feeding apparatus that includes a transmitter that is worn by an animal that is intended to access food in the apparatus and which includes a receiver in the apparatus that is adapted to receive and respond to a signal that is emitted by the transmitter.

Still another object of the invention is to provide a selective animal feeding apparatus that includes a transmitter that is worn by an animal that is intended to access food in the apparatus and which includes a receiver in the apparatus that is adapted to receive and respond to a signal that is emitted by the transmitter when the transmitter is proximate the apparatus and which is not adapted to receive and respond to the signal when the transmitter is disposed sufficiently far from the apparatus.

Still yet another object of the invention is to provide a selective animal feeding apparatus that includes a transmitter that is worn by an animal that is intended to access food in the apparatus and which includes a receiver in the apparatus that is adapted to receive and respond to a signal that is emitted by the transmitter and wherein the transmitter emits a continuous signal and when the transmitter is proximate the apparatus access to the food is granted and when the transmitter is not proximate the apparatus, access to the food is denied.

Yet another important object of the invention is to provide a selective animal feeding apparatus that includes a transmitter that is worn by an animal that is intended to access food in the apparatus and which includes a receiver in the apparatus that is adapted to receive and respond to a signal that is emitted by the transmitter and wherein only when the transmitter is proximate the apparatus it emits the signal and access to the food is granted and when the transmitter is not proximate the apparatus, it does not emit the signal and access to the food is denied.

Still yet another important object of the invention is to provide a selective animal feeding apparatus that prevents injury to an animal from occurring.

A first continuing object of the invention is to provide a selective animal feeding apparatus that prevents injury to an animal from occurring if the animal is in process of consuming food from the apparatus and for any reason, access to the food is then denied.

A second continuing object of the invention is to provide a selective animal feeding apparatus that includes a container that is removable apart from the apparatus.

Briefly, a selective animal feeding apparatus that is constructed in accordance with the principles of the present invention is either battery operated or runs on standard household voltage and current. A container is included that holds a quantity of food that is intended for consumption by a first animal. The first animal wears a transmitter that is adapted to emit a signal. The apparatus includes a receiver that is adapted to receive and detect the signal when the transmitter is sufficiently close to the apparatus. Upon detection of the signal, the apparatus opens a lid and allows access to the food by the first animal. When the first animal moves sufficiently far away from the apparatus, the signal is no longer detected and the apparatus closes the lid preventing further access to the food by either the first animal or by a second animal that may be proximate the apparatus. When the first animal is again disposed proximate the apparatus, the signal is again detected and the lid is again opened to allow further feeding by the first animal. According to a modification, the apparatus includes a method of enabling the transmitter to emit the signal only when the transmitter is proximate the apparatus, thereby extending battery life of the transmitter. A spring prevents injury to any animal should the lid attempt to close while the animal is consuming food from the apparatus.

DETAILED DESCRIPTION OF THE INVENTION

Figure 1:
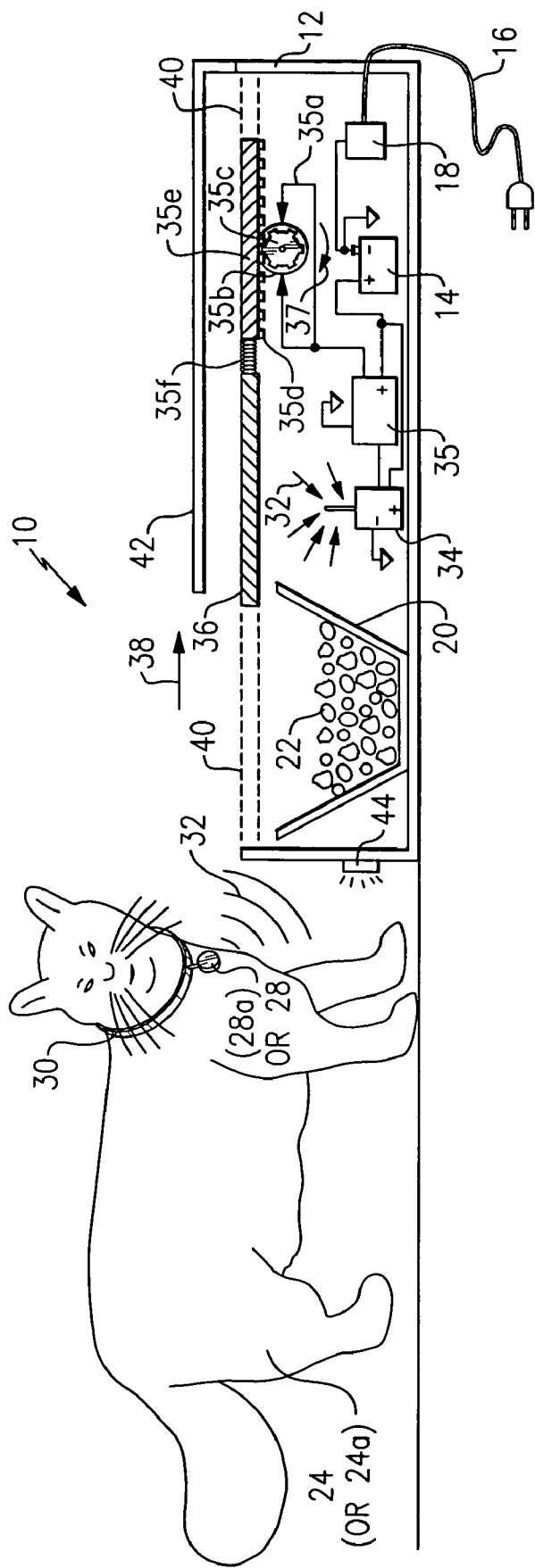
FIG. 1 is a cross-sectional view of a selective animal feeding apparatus in a first position adapted for the consumption of food.

Referring to both drawings and now in particular to FIG. 1 is shown, a selective animal feeding apparatus, identified in general by the reference numeral 10.

An enclosure 12 of the apparatus 10 preferably includes a battery 14 for portable or fail-safe operation in the event of an electrical power failure. A cord 16 and transformer 18 is preferably also provided for AC operation and to recharge the battery 14.

Figure 2:
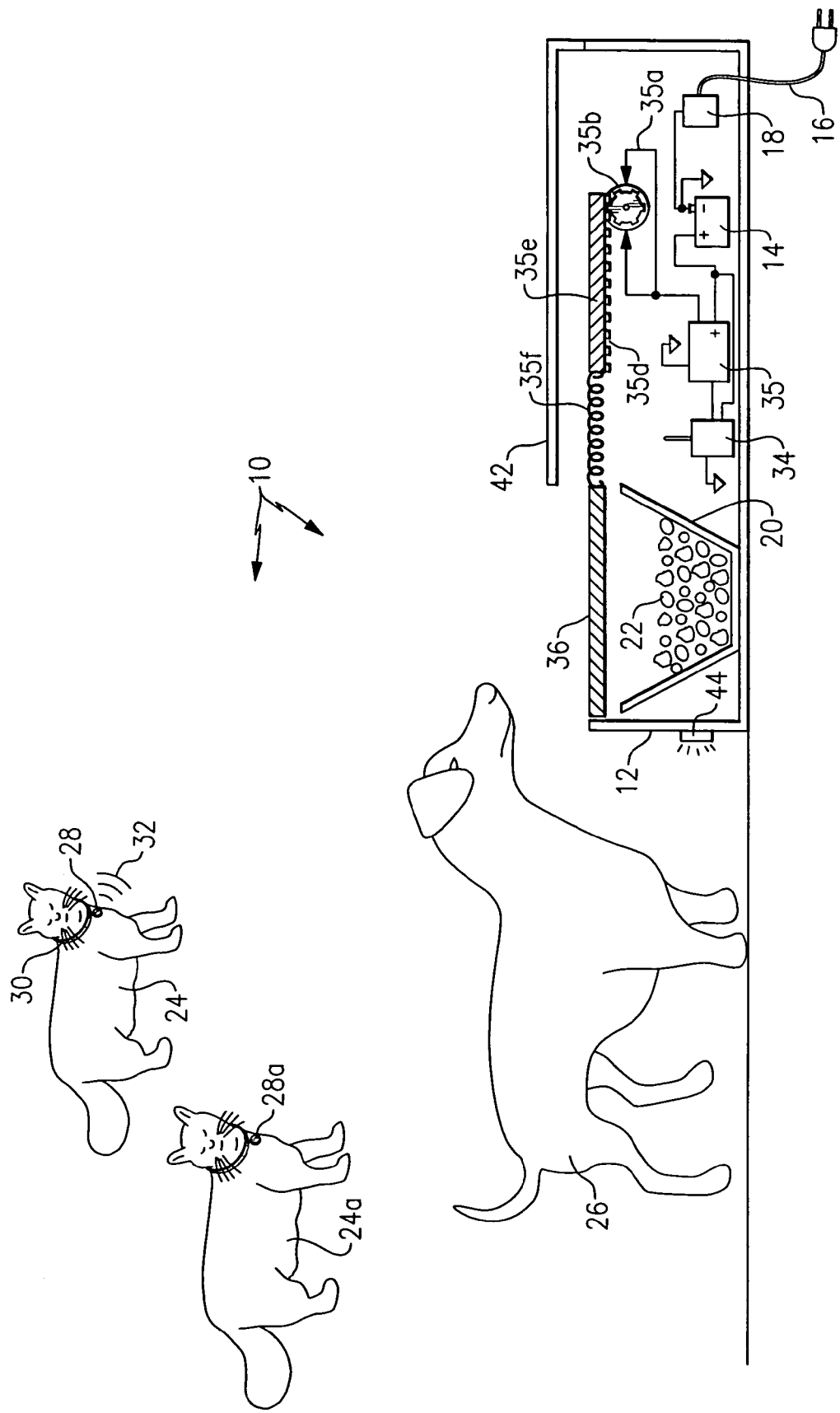
FIG. 2 is a cross-sectional view of the selective animal feeding apparatus of FIG. 1 in a second position that is not adapted for the consumption of food, and also including a possible modification thereto.

A container 20 fits inside the enclosure 12 and is adapted to hold a quantity of food 22 therein. The food 22 is intended for consumption by a first animal 24 and not for consumption by a second animal 26 (FIG. 2). The container 20, preferably, is adapted to be removed apart from the enclosure 12 (i.e., lifted out) for cleaning, as desired.

The first animal 24 wears a transmitter 28 that is secured to a collar 30. By way of example, the first animal 24 is a cat and the second animal 26 is a dog.

The transmitter 28 includes a battery (not shown) for its power and emits a signal 32.

The apparatus 10 includes a receiver 34 that is adapted to receive and detect the signal 32 when the transmitter 28 is sufficiently close to the apparatus 10. The signal 32 may include any preferred radio frequency (RF), infrared (IR), sonic, ultrasonic, laser, visible, invisible or any other type of a communicative signal that can be detected by the receiver 34. In the absence of the signal 32, the apparatus 10 remains in a quiescent state in which access to the food 22 is denied. This is described in detail, hereinafter.

When the first animal 24 moves sufficiently close to the enclosure 12, the receiver 34 is then able to detect the presence of the signal 32 from the transmitter 28.

Upon detection of the signal 32, the receiver 34 informs a control circuit 35. The control circuit 35 includes circuitry to detect the presence of the signal 32 or its absence and regulates its own output accordingly. If preferred, a microprocessor may be included to perform the required function. The receiver 34 and the control circuit 35 may be separate components or of integral design, as is known to those skilled in the electrical/electronic arts.

The control circuit 35 supplies a directional control signal 35a to a motor 35b. The motor 35b is preferably a DC type of motor and the direction of its rotation is controlled by the polarity of the directional control signal 35a. This is described in greater detail hereinafter.

The motor 35b includes a gear 35c that is cooperatively engaged with a linear gear 35d (i.e., a "rack" type of gear) that is attached to an actuator 35e. A spring 35f is attached intermediate the actuator 35e and a lid 36.

When the receiver 34 detects the signal 32, the control circuit 35 senses the presence of the signal 32 as output by the receiver 34. The control circuit 35 supplies the directional control signal 35a to the motor 35b with such polarity to cause the gear 35c to rotate in a clockwise direction as shown by arrow 37. This engages with the linear gear 35d and urges the actuator 35e in the direction of arrow 38. The actuator 35e pulls on the spring 35f, which in turn extends slightly and then exerts a resultant force on the lid 36. The resultant force pulls open the lid 36 by urging the lid 36 in the direction, also, as shown by arrow 38.

A first limit switch (not shown) is used to shut the motor 35b off once the actuator 35e, spring 35f, and lid 36 have been urged sufficiently far to the right to allow access to the food 22. The first limit switch can include any preferred micro-switch, photodiode, or other sensor.

It is, of course, possible to modify the control circuit 35 to cease to apply the directional control signal 35a to the motor 35b after a period of time has elapsed sufficient to open the lid 36.

There is no reason to keep energizing the motor 35b after the lid 36 has been opened providing the first animal 24 remains proximate the enclosure 12. As long as the first animal 24 remains sufficiently close to the enclosure 12, the lid 36 will remain in a first, open position. When the lid 36 is in the first, open position, the first animal 24 is able to access the food 22 in the container 20 and eat in a normal, unimpeded fashion.

The actuator 35e, spring 35f, and lid 36 are disposed in a track 40 (dashed lines) that secures each component to the enclosure 12 and allows for motion of each component in only the directions as are described herein.

The transmitter 28 normally emits the signal 32 with low signal 32 strength. This is for two reasons. The first is conserve and extend life of the battery that is disposed in the transmitter 28 and which supplies power thereto. The second reason for low signal 32 strength is to aid in detection of location of the first animal 24 with respect to the apparatus 10.

Referring now primarily to FIG. 2, when the first animal 24 moves sufficiently far away from the apparatus 10, the transmitter 28 also moves out of range. When the transmitter 28 is out of range, detection of the signal 32 by the receiver 34 is affected. Either the signal 32 is no longer detectable by the receiver 34 or the receiver 34 determines that the amplitude of the signal 32 is sufficiently low (i.e., low signal strength).

In either case, absence of a sufficient strength of the signal 32 is interpreted by the apparatus 10 to mean that the first animal 24 is no longer proximate the apparatus 10 and is not therefore feeding. This condition warrants closing of the lid 36 to prevent the second animal 26 (or any other animal or livestock) from consuming the food 22.

When there is lack of detection of the signal 32 by the apparatus, the receiver 34 informs the control circuit 35 which, in turn, reverses polarity of the directional control signal 35*a* that is applied to the motor 35*b*.

Accordingly, the gear 35*c* rotates in a counterclockwise direction opposite that of arrow 37. This urges the actuator 35*e* in a direction that is opposite arrow 38, which then compresses the spring 35*f* slightly, and then urges the lid 36 to move in the track 40 until it is disposed over the container 20, thereby preventing access to the food 22.

Access to the food 22 by either the first animal 24 or by the second animal 26 is therefore denied whenever the first animal 24 is no longer proximate the apparatus 10.

When the first animal 24 becomes hungry and moves toward the apparatus 10, the signal 32 is again detected by the receiver 34 and the process repeats. The lid 36 is again opened to allow an additional feeding opportunity for the first animal 24.

Figure 3:
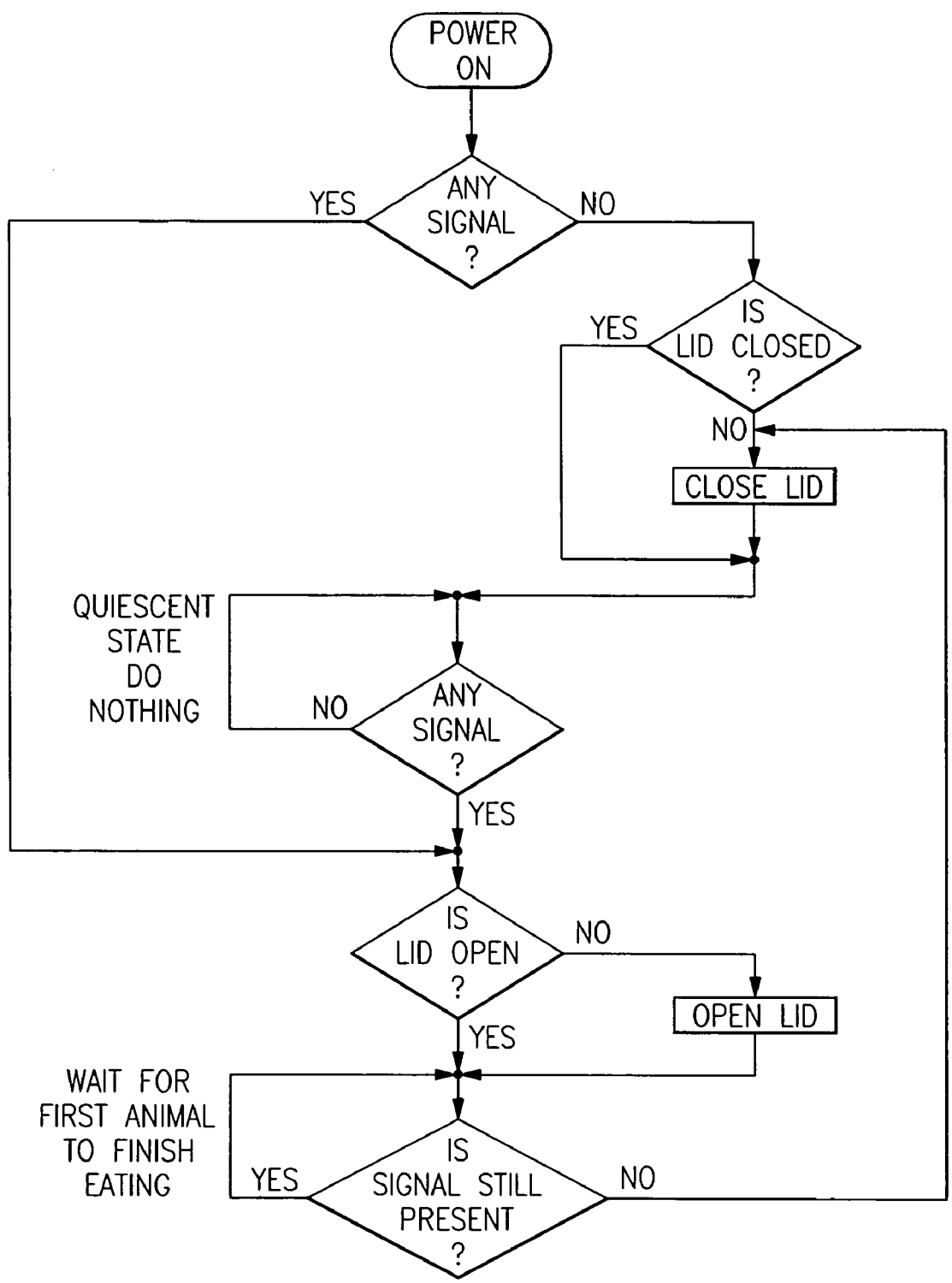
FIG. 3 is a high-level flow chart of the selective animal feeding apparatus of FIG. 1.

Referring briefly to FIG. 3, an executive, high-level flowchart of one possible control program for the control circuit 35, when it includes a microprocessor, is shown. Limit switches or other types of sensors, as described above, are used to determine the current position of the lid 36 (either closed or open) and then shut off the motor 35*b*.

To those having ordinary skill in the electronic and microprocessor arts, the inclusion of additional features is possible. For example, when executing the "close lid" function, a timer could be used to determine how long it actually takes to close the lid 36.

If the time to close the lid 36 is deemed to be excessive, it can be assumed that the opening over the container 20 is obstructed, perhaps by the head or neck of the first animal 24 or the second animal 26. To prevent possible injury, the "close lid" function would then cease its attempt to close the lid 36 and a command to open the lid 36 would be generated, if the timer setting was exceeded before detection of proper closure of the lid 36 had occurred.

Similarly, if desired, a pressure sensor could instead be used to determine if a magnitude of force that is applied to the lid 36 by the spring 35*f* exceeds a predetermined maximum limit. If the pressure was deemed to be excessive, another way of determining that the opening over the container 20 is likely obstructed is provided. Accordingly, the attempt to close the lid 36 would stop and the lid 36 would instead be opened for safety purposes.

Regardless of whether a timer or a pressure sensor (transducer) is used, after a predetermined period of additional time had elapsed, another attempt to close the lid 36 would occur until closure was eventually accomplished.

A cover 42 is included with the enclosure 12 over the actuator 35*e*, spring 35*f*, and portion of the lid 36 to prevent access to any components that are contained in the enclosure 12, other than of course the food 22 and container 20.

It may be desirable to further conserve battery life of the transmitter 28. This is useful because, if the transmitter 28 were to cease to emit the signal 32, the lid 36 would close and the first animal 24 could not feed.

Therefore, according to a modification, the apparatus 10 includes a method of enabling the transmitter 28 to emit the signal 32 only when the transmitter 28 is proximate the apparatus 10, thereby extending battery life of the transmitter 28.

Referring again to FIG. 2, a modified first animal 24*a* includes a modified transmitter 28*a*. The modified transmitter 28*a* does not emit the signal 32 when it is disposed sufficiently far from the enclosure 12, as shown in FIG. 2.

Referring again to FIG. 1, when the modified first animal 24*a* approaches the enclosure 12, a magnet 44 emits a magnetic field. A sensor in the modified transmitter 28*a*, for example a magnetic proximity switch, detects and responds to the magnetic field and energizes the modified transmitter 28*a* sufficient to emit the signal 32. As described above, the lid 36 opens and the modified first animal 24*a* is able to eat.

When the modified first animal wanders away from the enclosure 12 (as shown in FIG. 2), the magnetic field weakens and the proximity switch opens (for example) thereby causing a cessation of the signal 32. The lack of signal 32 causes the apparatus 10 to close the lid 36 thereby preventing consumption of the food by the second animal 26.

There is the possible danger that the battery that is disposed in the transmitter 28 and which is required for the signal 32 to be emitted can fail at any time. If the first animal 24 is in process of eating and the signal 32 were to cease being emitted for any reason (or a failure in its detection was to occur), the lid 36, as was described above, would begin to close. It would be disastrous if a neck of the first animal 24 were pinched by the closing lid 36 sufficient to cause injury or even death to the first animal 24 or to prevent withdrawal of the head of the first animal 24 away from the enclosure 12.

The spring 35*f* provides a fail-safe mechanism in that a sufficient force is applied to urge the lid 36 in a direction that is opposite that as shown by arrow 38, yet which precludes the application of an excessive force to the lid 36 that could potentially injure the first animal 24 or even trap the first animal 24 to the enclosure 12.

If the lid 36 were to attempt to close while the first animal 24 was eating the food 22 in the container 20, the slight increasing pressure that the lid 36 would apply to the first animal 24 would stimulate the first animal 24 to cease eating and to withdraw its head away from the enclosure 12. The spring 35*f* would also yield and allow the lid 36 to either open a greater amount or to remain open an amount sufficient to allow the first animal to withdraw its head. After the head was withdrawn from the enclosure, the spring 35*f* would allow the lid 36 to continue to close fully, as controlled by the motor 35*b*. As described hereinafter, it is also possible to sense an increase in pressure (if any animal is eating while the lid 36 is being closed) and to use that condition to stop closing and instead fully open the lid 36. A timer can similarly be used to detect an abnormally long closure time for the lid 36.

It is also possible that the second animal 26 might be lurking nearby, waiting for the first animal 24 to stop eating and for the first animal 24 to leave the area. At that especially opportune moment before the lid 36 had closed, the second animal 26 might begin to eat the food 22. As described above, the spring 35*f* and closing lid 36 would similarly stimulate the second animal 26 causing it to stop eating and to pull back from the enclosure 12. The lid 36 would then continue to close thereby preventing further consumption of the food 22 by the second animal 26.

Accordingly, injury to either the first animal 24 or to the second animal 26 is prevented from occurring.

It is important also to note that use of the apparatus 10 is intended primarily for those situations where daily monitoring of the food 22 being consumed is possible along with daily verification of the proper overall functioning of the apparatus 10. It is not intended to function, without additional fail-safe modification, as a long-term animal feeder for extended and unsupervised use. If a catastrophic failure were to occur, for example, there is the possibility that access to the food 22 by even the first animal 24 could be denied causing possible starvation of the first animal 24.

When use of the apparatus 10 is monitored on a daily basis, an owner can pick up the first animal 24 and walk up to the apparatus to ensure that the lid 36 opens properly when the first animal 24 is nearby and that it closes when the first animal is removed from proximity to the apparatus 10.

If the first animal 24 is a cat and the second animal 26 is a dog, the apparatus 10 functions as a "dog-proof cat bowl".

Of course, the frequency or any other characteristic of the signal 32 can be uniquely set for each transmitter 28 for use with a particular apparatus 10. The characteristic could be set either by the manufacturer or end user, as desired. This would allow several animals, for example several cats or several dogs, or combinations thereof to coexist and for each animal to wear their own transmitter 28 with each transmitter 28 emitting a unique signal 32. A separate apparatus 10, whose receiver 34 uniquely matched the signal 32 characteristic of the transmitter 28, would be used to contain the food 22 of each animal. To prevent a situation of multiple eating opportunities, each apparatus 10 could be placed away from any other apparatus 10.

When an animal approached the apparatus 10 that contained the food 22 which was intended for their consumption (i.e., their corresponding apparatus 10), the lid 36 would open and the animal could then eat. If the same animal approached any other apparatus 10, the signal 32 would not be proper and the lid 36 of the other apparatus 10 would not open.

Therefore, each animal would be granted access to their own food 22 but denied access to the food 22 intended for any other animal because each receiver 34 would respond only to a particular version of the signal 32.

The container 20 could also be used to contain water, medicine, or other supplements instead of, or in addition to the food 22. For example, the container 20 could include various compartments for each substance.

The invention has been shown, described, and illustrated in substantial detail with reference to the presently preferred embodiment. It will be understood by those skilled in this art that other and further changes and modifications may be made without departing from the spirit and scope of the invention which is defined by the claims appended hereto.

What is claimed is:

1. A selective animal feeding apparatus for feeding a food of a first animal to a first animal and for restricting access to said food to a second animal, comprising:
   (a) a container adapted to house said food of said first animal, said container including means for preventing access to said food when said apparatus is in a quiescent state said means for preventing access including a signal receiver;
   (b) means for accessing said food attached to said first animal wherein said means for accessing includes a transmitter, wherein when said first animal and said means for accessing is disposed proximate said container, said quiescent state is changed by said means for accessing sufficient to allow access to said food in said container by said first animal, and when said first animal and said means for accessing is disposed sufficiently far from said container, said means for accessing is of no effect and said quiescent state is returned and access to said food in said container is denied; and including means for preventing injury to said first animal or said second animal whenever access to said food in said container is denied wherein said means for preventing injury includes a lid adapted to be urged into a first, open position to allow access to said food and into a second, closed position to deny access to said food, and an actuator adapted to be urged intermediate said first position and said second position, and a spring intermediate said actuator and said lid, and wherein said spring is attached directly to said lid and wherein said spring is adapted to prevent said injury from occurring.

2. The apparatus of claim 1 wherein said first animal includes a cat and said second animal includes a dog.

3. The apparatus of claim 1 wherein said container includes a bowl and a lid, said lid adapted to be urged into a first position to allow access to said food disposed in said bowl and to be urged into a second position to prevent access to said food, and wherein when said means for accessing is disposed proximate said bowl, said lid is urged into said first position and when said means for accessing is disposed sufficiently far from said container, said lid is urged into said second position.

4. The apparatus of claim 3 wherein said means for accessing includes a transmitter and wherein said apparatus is adapted to receive a signal from said transmitter when said transmitter is proximate said apparatus, and wherein when said transmitter is sufficiently far from said container, said apparatus is not adapted to receive said signal.

5. The apparatus of claim 4 wherein when said apparatus is adapted to receive said signal, said lid is urged into said first position.

6. The apparatus of claim 4 wherein when said apparatus is not adapted to receive said signal, said lid is urged into said second position.

7. The apparatus of claim 4 wherein said signal includes a radio frequency signal.

8. The apparatus of claim 4 wherein said signal includes an infrared signal.

9. The apparatus of claim 4 wherein said signal includes a visible signal.

10. The apparatus of claim 4 wherein said signal includes an audible signal.

11. The apparatus of claim 4 wherein said signal includes an ultrasonic signal.

12. The apparatus of claim 1 wherein said means for accessing includes a transmitter and wherein said apparatus is adapted to receive a signal from said transmitter, and wherein when said means for accessing is disposed proximate said apparatus, said means for accessing emits said signal, and when said means for accessing is disposed sufficiently far from said apparatus, said means for accessing does not emit said signal.

13. The apparatus of claim 12 wherein when said means for accessing is disposed proximate said apparatus, said apparatus is adapted to receive said signal and wherein subsequent to a receipt of said signal by said apparatus, access to said food in said container is provided to said first animal.

14. The apparatus of claim 12 wherein when said means for accessing is disposed sufficiently from said apparatus, said apparatus is not adapted to receive said signal and wherein subsequent to a lack of receipt of said signal by said apparatus, access to said food in said container is denied to said first animal and to said second animal.

* * * * *